(12) United States Patent
Louvel

(10) Patent No.: US 10,903,751 B2
(45) Date of Patent: Jan. 26, 2021

(54) METHOD AND SYSTEM OF DRIVING AN ELECTRICALLY CONTROLLED SWITCH WITH A SNUBBER CAPACITOR

(71) Applicant: SEMICONDUCTOR COMPONENTS INDUSTRIES, LLC, Phoenix, AZ (US)

(72) Inventor: Jean-Paul Georges Rene Louvel, Colomiers (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/449,211

(22) Filed: Jun. 21, 2019

(65) Prior Publication Data

US 2020/0403518 A1    Dec. 24, 2020

(51) Int. Cl.
*H02M 3/335*    (2006.01)
*H02M 1/08*    (2006.01)
*H02M 1/34*    (2007.01)

(52) U.S. Cl.
CPC ......... *H02M 3/33592* (2013.01); *H02M 1/08* (2013.01); *H02M 1/34* (2013.01); *H02M 2001/346* (2013.01)

(58) Field of Classification Search
CPC ....... H02M 2001/346; H02M 3/33592; H02M 1/08; H02M 1/34
See application file for complete search history.

(56) References Cited

U.S. PATENT DOCUMENTS

| 5,081,558 A | * | 1/1992 | Mahler | H01H 9/542 361/13 |
| 5,153,453 A | * | 10/1992 | Walters | G05F 3/18 327/502 |
| 5,708,571 A | * | 1/1998 | Shinada | H02M 3/33592 363/16 |

(Continued)

OTHER PUBLICATIONS

"High Performance Current Mode Resonant Controller with Integrated High-Voltage Drivers," ON Semiconductor Product Description Publication No. NCP13992, May 2019—Rev. 4, 30 pages, Copyright Semiconductor Components Industries, LLC.

(Continued)

*Primary Examiner* — Matthew V Nguyen
*Assistant Examiner* — Jye-June Lee
(74) *Attorney, Agent, or Firm* — Dickinson Wright PLLC; Mark E. Scott

(57) ABSTRACT

Driving an electrically controlled switch with a snubber capacitor. At least some example embodiments involve operating a power converter, including: charging a snubber capacitor coupled to a secondary winding of a transformer arranged for flyback operation, the charging during a charge mode of a primary winding the transformer; charging a gate of a secondary field effect transistor (FET) with current from the snubber capacitor, the charging of the gate during a discharge mode of the primary winding, the discharge mode contiguous with the charge mode; providing current through a secondary rectifier and the secondary FET to a secondary output node of the power converter, the secondary rectifier coupled in series with the secondary FET; and making the secondary FET non-conductive.

16 Claims, 8 Drawing Sheets

(56) References Cited

U.S. PATENT DOCUMENTS

| | | | | |
|---|---|---|---|---|
| 6,078,509 A * | 6/2000 | Jacobs | ............... | H02M 3/33561 |
| | | | | 363/21.18 |
| 6,181,579 B1 * | 1/2001 | Nagai | ................ | H02M 3/33592 |
| | | | | 363/21.06 |
| 6,191,960 B1 * | 2/2001 | Fraidlin | ............... | H02M 3/3353 |
| | | | | 363/25 |
| 6,856,522 B1 * | 2/2005 | Wittenbreder, Jr. | .. | H02M 1/083 |
| | | | | 363/21.01 |
| 7,304,867 B2 * | 12/2007 | Usui | ................. | H02M 3/33561 |
| | | | | 336/183 |
| 7,330,360 B2 * | 2/2008 | Lee | ........................ | H02M 3/158 |
| | | | | 363/21.12 |
| 9,621,048 B2 * | 4/2017 | Hosotani | ............ | H02M 3/33553 |
| 10,277,107 B1 * | 4/2019 | Iorio | ..................... | H02M 1/083 |
| 10,516,341 B1 * | 12/2019 | Fu | ............................ | H02M 1/08 |
| 2007/0041226 A1 * | 2/2007 | Powers | ............. | H02M 3/33561 |
| | | | | 363/21.12 |
| 2008/0290730 A1 * | 11/2008 | Julicher | ............ | H02M 3/33561 |
| | | | | 307/31 |
| 2012/0187869 A1 * | 7/2012 | Angelin | ................. | H05B 45/37 |
| | | | | 315/307 |
| 2016/0081171 A1 * | 3/2016 | Ichikawa | ............... | H05B 45/37 |
| | | | | 315/77 |

OTHER PUBLICATIONS

"Secondary Controller for Multi-Output Quasi-Resonant Switchmode Power Supplies," ON Semiconductor Product Description Publication No. NCP4326, Jul. 2009—Rev. 2, 29 pages, Copyright Semiconductor Components Industries LLC.

* cited by examiner

METHOD AND SYSTEM OF DRIVING AN ELECTRICALLY CONTROLLED SWITCH WITH A SNUBBER CAPACITOR

CROSS-REFERENCE TO RELATED APPLICATIONS

Not Applicable.

BACKGROUND

Switching power converters are used in electronic devices to create various supply voltages. In some cases a single switching power converter may have or produce multiple voltage outputs. For example, a switching power converter used in a light emitting diode (LED) television may produce one or more relatively low voltages (e.g., 5 volts, 12 volts) to power electronic devices within the LED TV, and also produce one or more relatively high voltages (e.g., 400 volts) to power LED strings. When a single switching power converter creates multiple voltage outputs, each voltage output is separately regulated, such as with a field effect transistor (FET). However, regulating the high voltage output may be difficult as making a FET conductive involves driving the gate of the FET to a voltage that is very close to the voltage on the source of the FET. If the source of the FET is at the relatively high voltage output, it may be difficult in some cases to get sufficient voltage and/or current to the gate to make the FET conductive.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices, the terms "input" and "output" refer to electrical connections to the electrical devices, and shall not be read as verbs requiring action. For example, a controller may have a gate output and one or more sense inputs.

"Controller" shall mean individual circuit components, an application specific integrated circuit (ASIC), a microcontroller with controlling software, a digital signal processor (DSP), a processor with controlling software, a field programmable gate array (FPGA), or combinations thereof, configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to power converters that produce multiple voltage outputs. More particularly, example embodiments are directed to power converters that have a low-side voltage output regulated directly or indirectly by the primary-side controller, and a high-side voltage output regulated by a high-side secondary controller. More particularly still, example embodiments are directed a method and system of control of a secondary field effect transistor (FET) that is made conductive in each discharge mode of a flyback transformer based on current stored in a snubber capacitor of high-side secondary rectifier, and whose on-time in each discharge mode is controlled based on the high-side voltage output. The specification first turns to an example switching power converter to orient the reader.

Figure 1:
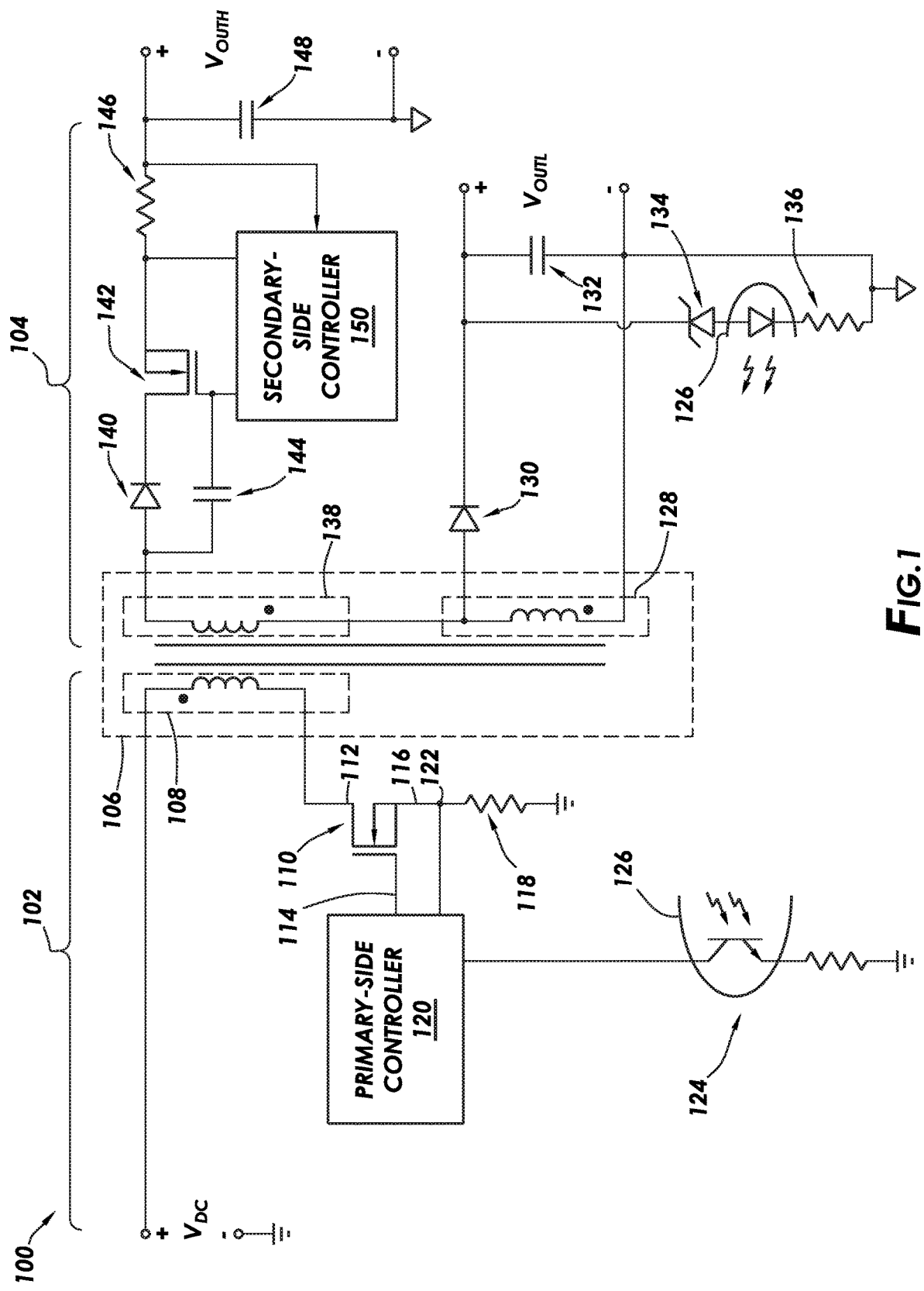
FIG. 1 shows an electrical schematic of a power converter in accordance with at least some embodiments.

FIG. 1 shows an electrical schematic of a power converter 100 in accordance with at least some embodiments. In particular, the power converter 100 comprises a primary side 102 galvanically isolated from a secondary side 104 by way of a main transformer 106. A direct current (DC) input voltage $V_{DC}$ is supplied to the power converter 100 (e.g., alternating current (AC) signal rectified by a half- or full-wave rectification). The example power converter creates two DC voltage outputs: a low-side voltage output $V_{OUTL}$; and a high-side voltage output $V_{OUTH}$. The primary side 102 comprises a primary winding 108 of the main transformer 106, with a first lead or connection of the primary winding 108 coupled to the positive node of the supply voltage $V_{DC}$. The second lead or connection of the primary winding 108 couples a main switch or main FET 110. In particular, the main FET 110 defines a drain 112, a gate 114, and a source 116. The drain 112 couples to the second connection of the primary winding 108. The source 116 couples to an example sense resistor 118, and the second side of the sense resistor 118 couples to ground on the primary side 102.

The primary side 102 of the power converter 100 is controlled by a primary-side controller 120. The primary-side controller 120 couples to the gate 114 of the main FET 110, and thereby controls the conductive and non-conductive states of the main FET 110. The primary-side controller 120 further couples to a current sense node 122 defined between the source 116 and the sense resistor 118. The example primary-side controller 120 is further coupled to a voltage feedback circuit 124. The voltage feedback circuit 124 provides a signal indicative of the low-side output voltage $V_{OUTL}$ to the primary-side controller 120. The example voltage feedback circuit 124 is implemented in the form of a transistor having an optically driven base, such as the transistor of an opto-coupler 126. The LED of the example opto-coupler 126 is coupled to the low-side output voltage $V_{OUTL}$, and is discussed more below.

On the secondary side 104, the example power converter 100 comprises a low-side secondary winding 128 of the main transformer 106. A first lead or connection of the low-side secondary winding 128 couples to an anode of a low-side rectifier 130, and the cathode of the low-side rectifier 130 couples to the low-side voltage output $V_{OUTL}$. A low-side smoothing capacitor 132 couples between the positive node of the low-side voltage output $V_{OUTL}$ and the negative or return of the low-side voltage output $V_{OUTL}$, which common or return defines a reference voltage on the secondary side 104. In the example circuit an indication of the magnitude of the low-side voltage output $V_{OUTL}$ is provided to the primary side by way of LED of the opto-coupler 126. In the example shown, the LED of the opto-coupler is coupled in series with a Zener diode 134 and a current limiting resistor 136.

The low-side voltage output $V_{OUTL}$ is designated "low-side" in this description to not only reference position in the example electrical schematic, but also to indicate that in example embodiments multiple voltage outputs are created, and the voltage output associated with the low-side secondary winding 128 is has the lower magnitude. In the example of FIG. 1, the low-side includes the low-side rectifier 130 as a passive element. However, in other cases the rectification performed by the low-side rectifier may be implemented by a synchronous rectifier in the form of an actively controlled FET and corresponding packaged integrated circuit (IC) controller.

In accordance with example embodiments, the secondary side 104 further comprises a high-side secondary winding 138. The high-side secondary winding 138 is shown as a separate and distinct winding from the low-side secondary winding 128. However, in other cases the high-side secondary winding and low-side secondary winding may be the same winding with a center tap. The high-side secondary winding 138 couples to a high-side rectifier 140. The high-side rectifier 140 defines an anode coupled to the first lead of the high-side secondary winding 138, and a cathode coupled to the drain of a secondary FET 142. A snubber capacitor 144 has a first lead coupled to the anode of the high-side rectifier 140, and a second lead coupled to the gate of the secondary FET 142. The snubber capacitor 144 not only acts to filter unwanted voltage spikes caused the switching effect of the high-side rectifier 140, but as discussed more below the snubber capacitor 144 in example embodiments also helps drive the gate of the secondary FET 142 during each discharge mode.

The source of the secondary FET 142 couples to the high-side voltage output $V_{OUTH}$ by way of a current sense resistor 146. In particular, the first lead of the current sense resistor 146 couples to the source of the secondary FET 142, and the second lead couples to the positive node of the high-side voltage output $V_{OUTH}$. A high-side smoothing capacitor 148 couples between the positive node of the high-side voltage output $V_{OUTH}$ and the negative or return of the high-side voltage output $V_{OUTH}$, which common or return defines a reference voltage on the secondary side 104.

The example secondary side 104 further comprises a secondary-side controller 150. The secondary-side controller 150 is coupled to the gate of the secondary FET 142, the source of the secondary FET 142, and the high-side voltage output $V_{OUTH}$. The secondary-side controller 150 is configured to sense each discharge mode of the power converter 100, and during each discharge mode control a length of time the secondary FET 142 is conductive based on a magnitude of the voltage of the high-side voltage output $V_{OUTH}$. Operation of the example circuit, including the secondary-side controller 150, is discussed more below after discussion of operation of the example power converter 100.

The example power converter 100 works by transferring energy across the main transformer 106 by making the main FET 110 conductive and then non-conductive. That is, when the main FET 110 is conductive, electrical current flows from the voltage source $V_{DC}$, through the primary winding 108, through the main FET 110, and through the sense resistor 118 to ground. When the main FET 110 is conductive, the power converter 100 is storing charge in the field of the main transformer 106. Once the current flow reaches a predetermined value (hereafter "peak current"), the main FET 110 is made non-conductive. The period of time that the main FET 110 is conductive is referred to as a charge mode. After the charge mode, the main FET 110 remains non-conductive for a period of time to enable the energy stored in the field of the main transformer 106 to supply the low- and high-side voltage outputs (discussed more below). The period of time that the main FET 110 is non-conductive is referred to as the discharge mode. During operation, the power converter 100 alternates back and forth between the charge mode and the discharge mode.

In accordance with example embodiments, the peak current used during each charge mode may vary based on the signal indicative of voltage output received by the primary-side controller 120. For example, if the low-side voltage output $V_{OUTL}$ is low, the peak current within a charge mode is increased. Oppositely, if the low-side voltage output $V_{OUTL}$ is high, the peak current within a charge mode is decreased. Thus, the primary-side controller 120 is configured to control the main FET 110 based on a voltage indicative of a low-side voltage output. While the example power converter 100 senses the low-side voltage output $V_{OUTL}$ through the voltage feedback circuit 124, other methods and systems may be used. For example, the primary-side controller 120 may sense the low-side voltage output $V_{OUTL}$ by way of an auxiliary winding (not specifically shown) of the main transformer 106. In other cases, a low-side secondary controller (not shown) may be present to control a SR FET (not shown), and the low-side secondary controller may communicate with the primary-side controller 120 when to begin each charge mode.

Turning now to the secondary side 104 operation, during periods of time when the main FET 110 is conducting a voltage is induced on the low-side secondary winding 128 with a polarity as shown by the dot convention in FIG. 1. The polarity of the voltage induced during each charge mode tends to reverse bias the low-side rectifier 130. It follows that during periods of time when the main FET 110 is conducting no current flows in the low-side secondary winding 128. Thus, energy is stored in the field of the main transformer 106 during each charge mode when the main FET 110 is conducting. Once the main FET 110 is made non-conductive, and thus a contiguous discharge mode begins, the voltage induced on the low-side secondary winding 128 reverses. The polarity of the low-side secondary winding 128 during the discharge mode forward biases the low-side rectifier 130, and the collapsing field produces current flow through the low-side rectifier 130 to charge the low-side capacitor 132 and/or supply current to the low-side load (not specifically shown). That is, once the main FET 110 is made non-conductive the energy is transferred from the field of the main transformer 106 to the low-side output voltage $V_{OUTL}$. Thus, the low-side secondary winding 128 in the example power converter 100 shown is arranged for flyback operation.

Still referring to FIG. 1, during periods of time when the main FET 110 is conducting a voltage is also induced on the high-side secondary winding 138 with a polarity as shown by the dot convention in FIG. 1. The polarity of the voltage induced during charge modes tends to reverse bias the high-side rectifier 140. It follows that during periods of time when the main FET 110 is conducting no current flows in the high-side secondary winding 138. Thus again, energy is stored in the field of the main transformer 106 during each charge mode when the main FET 110 is conducting. Once the main FET 110 is made non-conductive, and thus a contiguous discharge mode begins, the voltage induced on the high-side secondary winding 138 reverses. The polarity of the high-side secondary winding 138 during the discharge mode forward biases the high-side rectifier 140, and the collapsing field produces current flow through the high-side rectifier 140. Thus, the high-side secondary winding 138 in the example power converter 100 shown is also arranged for flyback operation.

In accordance with example embodiments, the secondary FET 142 is conductive during at least a portion of each discharge mode. Thus, the collapsing field produces current flow through the high-side rectifier 140, the secondary FET 142, the current sense resistor 146 to charge the high-side smoothing capacitor 148 and/or supply current to the high-side load (not specifically shown).

Regulation of the low-side voltage output $V_{OUTL}$ is implemented at least in part by the primary-side controller 120 controlling or modulating the peak current used in each charge mode. Higher peak current implies more energy to be transferred to the voltage outputs (thus tending to raise the voltage outputs), and lower peak current implies less energy to be transferred to the voltage outputs (thus tending to lower the voltage outputs). However, the loads presented at each voltage output may not, and likely do not, track together. For example, the low-side voltage output $V_{OUTL}$ may be heavily loaded when the high-side voltage output $V_{OUTH}$ is lightly loaded, and vice versa. For this reason, in example embodiments the secondary-side controller 150 modulates or regulates the conduction or on-time of the secondary FET 142 in each discharge mode based on the magnitude of the high-side voltage output $V_{OUTH}$. If the high-side voltage output $V_{OUTH}$ is above a predetermined value, the conduction or on-time of the secondary FET 142 during a particular discharge mode will be decreased compared to, for example, an on-time of the secondary FET 142 during a discharge mode when the high-side output voltage $V_{OUTH}$ is low. Oppositely, if the magnitude of the high-side voltage output $V_{OUTH}$ is below a predetermined value, the conduction or on-time of the secondary FET 142 during a particular discharge mode will be increased compared to, for example, an on-time of the secondary FET 142 during a discharge mode when the high-side output voltage $V_{OUTH}$ is high.

Still referring to FIG. 1, the example secondary FET 142 has its source coupled to the high-side voltage output $V_{OUTH}$ through the current sense resistor 146. During periods of time when the secondary FET 142 is non-conductive and thus no current is flowing through the current sense resistor 146, the voltage on the source of the secondary FET 142 equals the high-side voltage output $V_{OUTH}$. During periods of time when the secondary FET 142 is conductive and thus current is flowing through the current sense resistor 146, the voltage on the source of the secondary FET 142 relative to common on the secondary side may be higher than the high-side voltage output $V_{OUTH}$. In order to make the secondary FET 142 conductive the gate of the secondary FET 142 is driven to voltage higher than the voltage on the source. An issue arises in implementing high-side control in that it may be difficult for the secondary-side controller 150 to produce or generate a sufficiently high voltage to apply to the gate to make the secondary FET 142 conductive or at least fully conductive. A similar issue arises in keeping the secondary FET 142 conductive or fully conductive when current is flowing through the secondary FET 142. Various example embodiments address, at least in part, the issues regarding having sufficient voltage and/or current to drive the secondary FET 142 by using current stored in the snubber capacitor 144.

Figure 2:
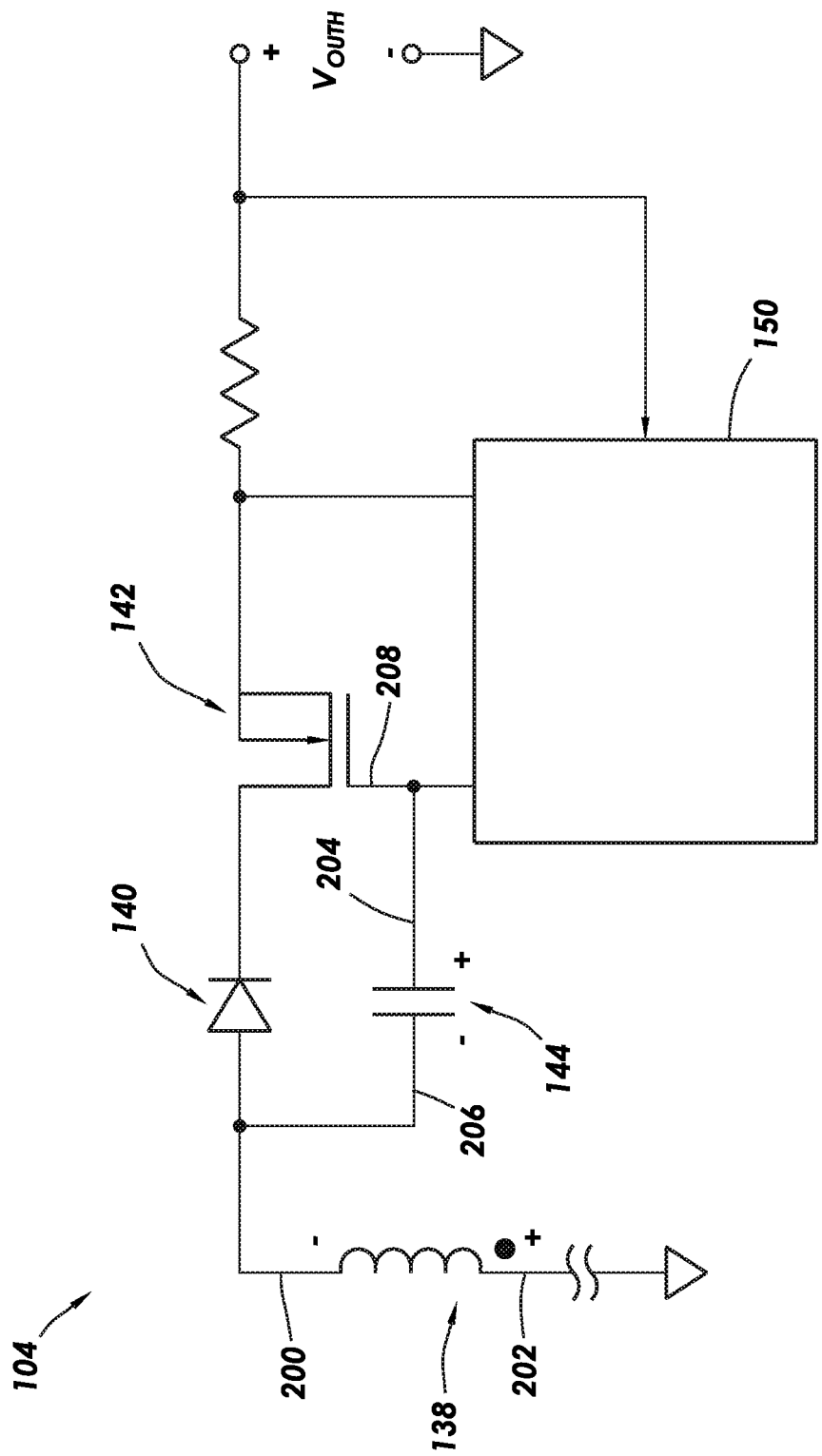
FIG. 2 shows an electrical schematic of a portion of the secondary side of the power converter, in accordance with at least some embodiments.

FIG. 2 shows an electrical schematic of a portion of the secondary side of the power converter, in accordance with at least some embodiments. In particular, consider that FIG. 2 shows the high-side of the secondary side 104 near the end of the charge mode. During the charge mode, the voltage on the first lead 200 of the high-side secondary winding 138 is lower than the voltage the second lead 202, and thus the voltage across the high-side secondary winding 138 has polarity as shown in FIG. 2 by the plus and minus symbols. The polarity shown in FIG. 2 referred to as a negative polarity. The magnitude of the voltage with the negative polarity in the charge mode depends on the input voltage to the power converter and the turns ratio of the low- and high-side secondary windings. Considering that in many cases the low-side voltage output (e.g., 5 volts) is three orders of magnitude lower than the high-side voltage output (e.g., 400 volts), the magnitude of the voltage with the negative polarity during the charge mode is approximately equal to the magnitude of the high-side voltage output. It follows the high-side rectifier 140 is reversed biased during the charge mode.

Moreover, consider that the voltage with the negative polarity across the high-side secondary winding 138 during the charge mode has charged the snubber capacitor 144 such that the voltage on the first lead 204 is higher relative to the second lead 206 of the snubber capacitor 144, and as shown by the plus and minus symbols associated with the snubber capacitor 144. How the current to create the charge reaches the snubber capacitor 144 is discussed more below. Further assume the secondary-side controller 150 has a high input impedance at the connection to the gate 208 such that the gate is effectively electrically floated. Now consider that the charge mode illustrated in FIG. 2 ends, and the contiguous discharge mode begins.

Figure 3:
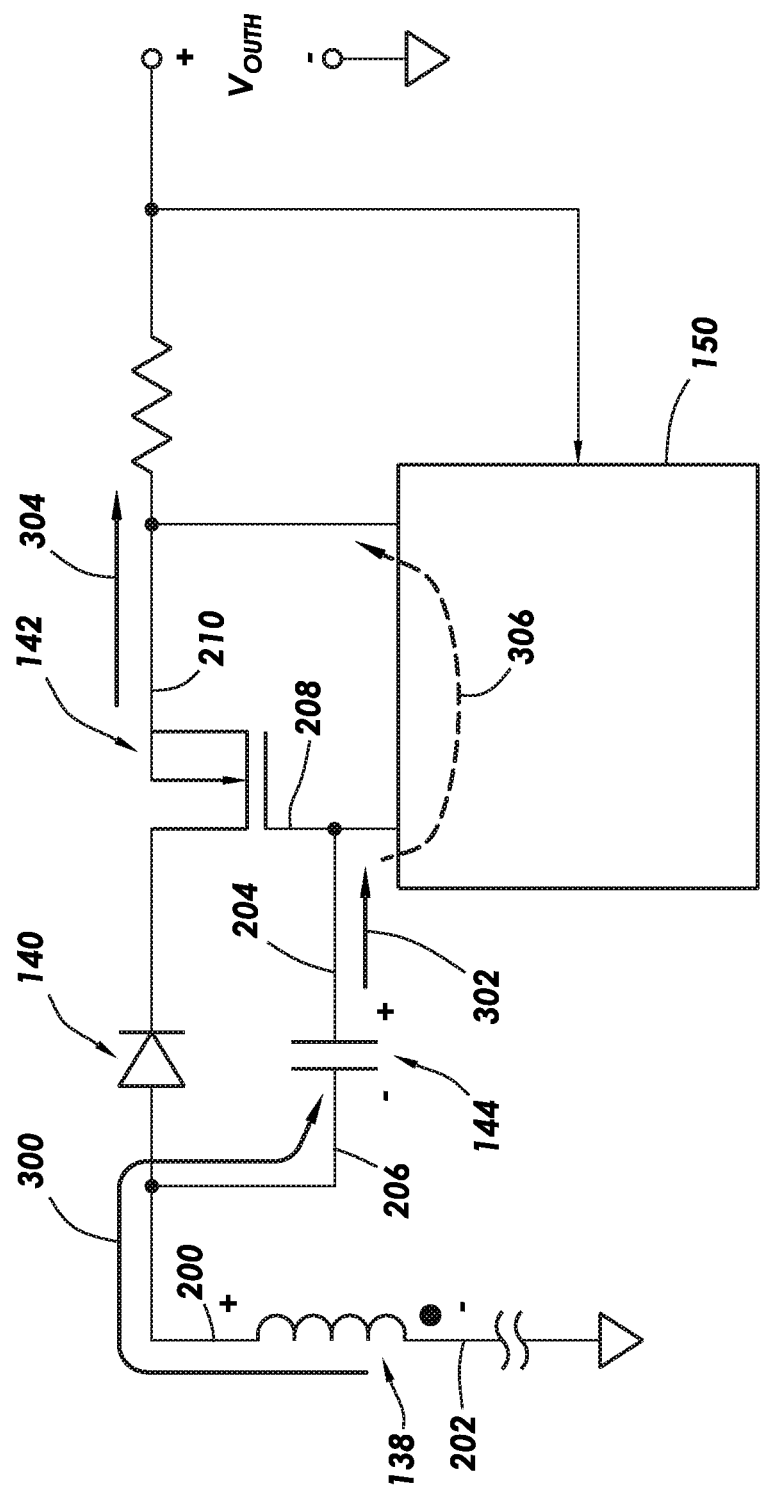
FIG. 3 shows an electrical schematic of a portion of the secondary side of the power converter, in accordance with at least some embodiments.

FIG. 3 shows an electrical schematic of a portion of the secondary side of the power converter, in accordance with at least some embodiments. In particular, consider that FIG. 3 shows the high-side at the beginning of the contiguous discharge mode. During the discharge mode the voltage on the first lead 200 of the high-side secondary winding 138 becomes higher than the voltage the second lead 202, and thus has polarity as shown in FIG. 2 by the plus and minus symbols. The polarity shown in FIG. 3 referred to as a positive polarity. The transition from the voltage with negative polarity during the charge mode to the highest discharge-mode voltage with positive polarity happens quickly, but is not instantaneous. For purposes of discussion consider that, while the voltage on the high-side secondary winding 138 has the positive polarity shown, the magnitude of the voltage has not risen high enough to forward bias the high-side rectifier 140.

Nevertheless, in the condition assumed in FIG. 3 the voltage swing experienced by the second lead 206 of the snubber capacitor 144 has a magnitude approximately equal to the magnitude of the high-side voltage output. The voltage swing experience by the second lead 206 (e.g., from negative $V_{OUTH}$ to between 0.0 and positive 0.7 volts in this example) results in current flow through the high-side secondary winding 138 to the snubber capacitor 144 as shown by arrow 300 (hereafter current 300). As positive charge accumulates on the plate of the snubber capacitor 144 associated with the second lead 206, the charge previously accumulated on the plate associated with the second lead 206 is forced out of the snubber capacitor 144 resulting in a current flow to the gate 208 of the secondary FET 142 as shown by arrow 302 (hereafter current 302). The current 302 thus raises the voltage on the gate 208 and makes the secondary FET 142 conductive. In fact, in example cases the secondary FET 142 is made fully conductive (e.g., driven to saturation) prior to the point when the high-side rectifier 140 is forward biased and current begins to flow through the high-side rectifier 140. Stated another way, in some cases the secondary FET 142 is made conductive before the voltage across the high-side secondary winding 138 reaches zero volts in a voltage swing from negative polarity during the charge mode to positive polarity during the discharge mode. By having the secondary FET 142 conductive prior to current flow through the secondary FET 142, switching losses are reduced or eliminated.

The example secondary FET 142, regardless of vintage or construction technique, will have a certain amount of parasitic capacitance between the gate 208 and the source 210. Because of the parasitic capacitance of the secondary FET 142, driving a voltage to the gate 208 may also result in current flow out of the source 210, as shown by arrow 304 (hereafter current 304). For later generations of FET devices, the gate-to-source parasitic capacitance is relatively low, and the capacitance of snubber capacitor 144 used for snubbing purposes is sufficient to drive the gate 208 high enough to make the secondary FET 142 conductive. However, if older generations of FET devices with higher gate-to-source parasitic capacitance are used, the capacitance of the snubber capacitor 144 may be increased appropriately.

The snubber capacitor 144 may store more charge than needed to drive the gate 208 sufficiently to make the secondary FET 142 to be fully conductive. To ensure the voltage on the gate 208 does not exceed design tolerances, during the condition shown in FIG. 3 the secondary-side controller 150 may clamp the voltage across the gate 208 and source 210. Thus, a portion of the current 302 may be diverted through the secondary-side controller 150, as shown by dashed line 300. An example circuit within the secondary-side controller 150 to clamp the voltage is discussed more below. Thus, before the high-side rectifier 140 is conductive, and possibly before the voltage on the high-side secondary winding 138 reaches zero in the voltage swing from negative polarity to positive polarity, the secondary FET 142 is conductive in the example system.

Figure 4:
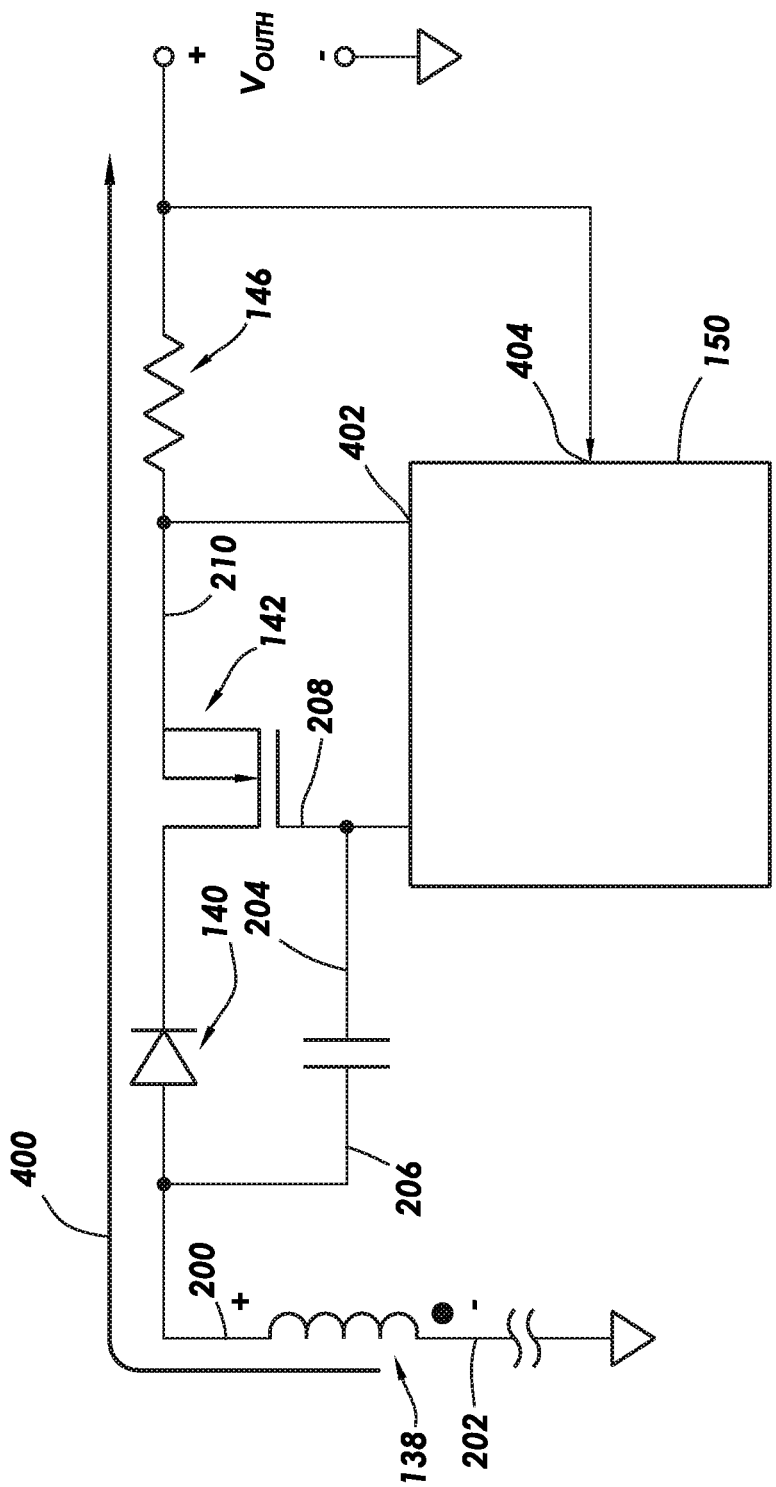
FIG. 4 shows an electrical schematic of a portion of the secondary side of the power converter, in accordance with at least some embodiments.

FIG. 4 shows an electrical schematic of a portion of the secondary side of the power converter, in accordance with at least some embodiments. In particular, consider that FIG. 4 shows the high-side during the contiguous discharge mode, but further into the contiguous discharge mode than FIG. 3. As before, the high-side secondary winding 138 has a positive polarity, and in the example of FIG. 3 the magnitude of the has risen high enough that the high-side rectifier 140 is forward biased and conducting current. Given that the secondary FET 142 is already conductive, current flows from the high-side secondary winding 138, through the high-side rectifier 140, through the secondary FET 142, through the current sense resistor 146, and to the high-side voltage output $V_{OUTH}$ as shown by arrow 400 (hereafter current 400).

In accordance with example embodiments, the secondary-side controller 150 senses that power converter is in the discharge mode. The sensing may take any suitable form. In the example system shown, the secondary-side controller 150 may sense the current 400 as indicative of the discharge mode. Sensing the current 400 may be by sensing the differential voltage across the current sense resistor 146 using a current sense input 402 coupled to the source 210 and a feedback input 404 coupled to the high-side voltage output $V_{OUTH}$. In other cases, the secondary-side controller 150 may additionally directly couple to the drain of the secondary FET 142 (connection not specifically shown), or directly couple to the first lead 200 of the high-side secondary winding 138 (connection not specifically shown), and the transition to the discharge mode may be sensed through either of those example connections.

The secondary-side controller 150 monitors the high-side output voltage $V_{OUTH}$ by way of the feedback input 404, and controls the high-side output voltage $V_{OUTH}$. In particular, during each discharge mode the secondary-side controller 150 is configured to modulate or control a length of time that the secondary FET 142 is conductive, hereafter referred to as the "on-time." That is it say, each discharge mode has a length of time in which current could be supplied from the high-side secondary winding 138 to the high-side output voltage $V_{OUTH}$, but the secondary-side controller 150 may make the on-time shorter than the length of time of the discharge mode depending on a magnitude of the high-side output voltage $V_{OUTH}$. Stated slightly differently, the secondary-side controller 150 is configured to sense each discharge mode of the power converter, and during each discharge mode the secondary-side controller 150 is configured to control on-time by controlling the length of time the secondary-side controller 150 clamps the gate-to-source voltage at a predetermined voltage. If the high-side output voltage $V_{OUTH}$ is above a predetermined value, the secondary-side controller 150 may make the on-time shorter than the discharge mode. And oppositely, if the high-side output voltage $V_{OUTH}$ is below the predetermined value, the secondary-side controller 150 may make the on-time the full length of the discharge mode.

At the appropriate time, the secondary-side controller 150 makes the secondary FET 142 non-conductive shorting the gate 208 to the source 210, or otherwise lowering the voltage on the gate 208 relative to the source 210. An example circuit within the secondary-side controller 150 to short the gate 208 to the source 210 is discussed more below. Now consider that the discharge mode illustrated in FIGS. 3 and 4 ends, and the contiguous charge mode begins.

Figure 5:
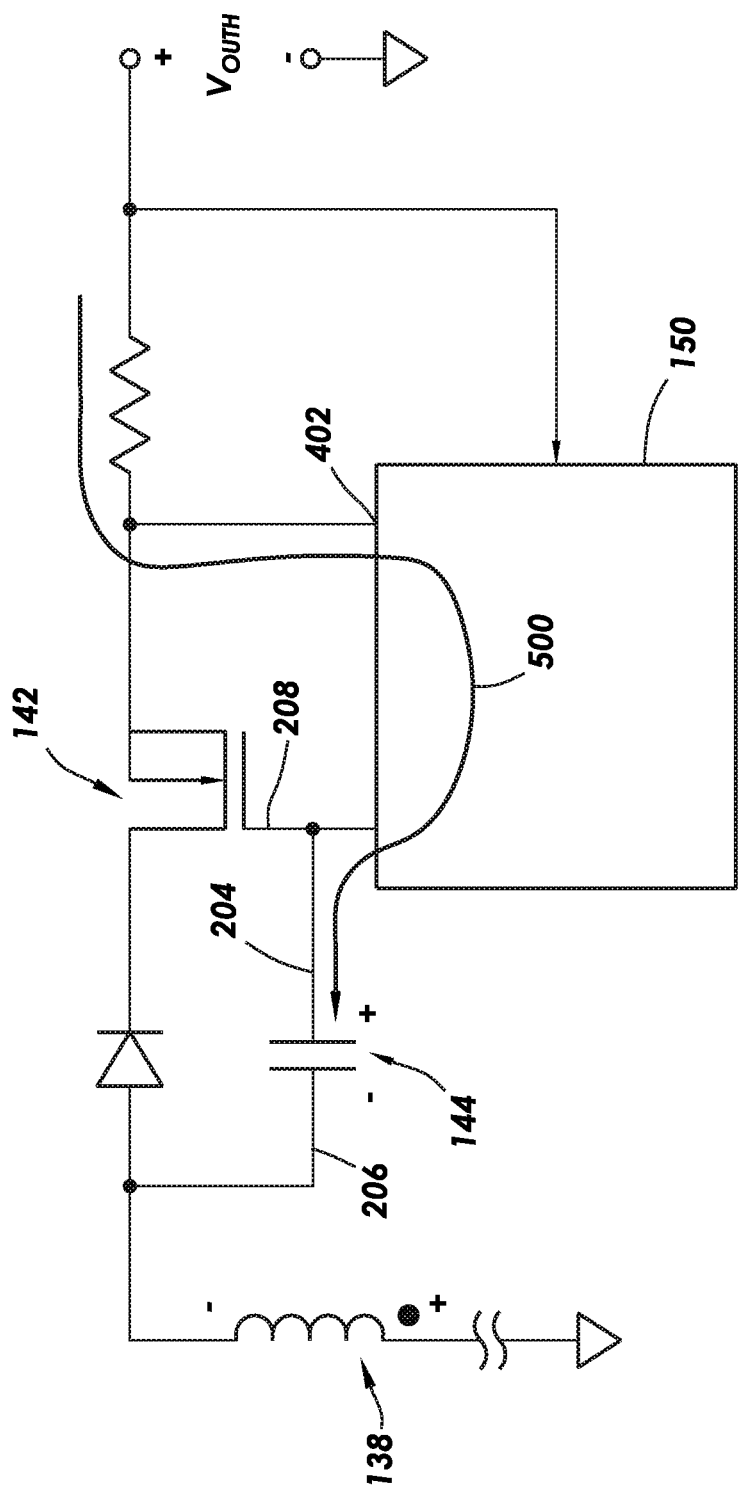
FIG. 5 shows an electrical schematic of a portion of the secondary side of the power converter, in accordance with at least some embodiments.

FIG. 5 shows an electrical schematic of a portion of the secondary side of the power converter, in accordance with at least some embodiments. In particular, consider that FIG. 5 shows the high-side at the beginning of the next charge mode (i.e., contiguous charge mode following the discharge mode of FIGS. 3 and 4). As in the first example charge mode, the high-side secondary winding 138 has a negative polarity. Moreover, consider that the charge mode has just begun, and the snubber capacitor 144 has not been fully charged.

The voltage across the snubber capacitor 144 at the transition between a charge mode and a discharge mode depends on the on-time in relation to the length of the discharge mode. Stated generically, the voltage on the snubber capacitor 144 will be approximately the difference in voltage between the high-side output voltage $V_{OUTH}$ and the instantaneous voltage of the high-side secondary winding 138 at the time the secondary FET 142 becomes non-conductive. If the on-time was much shorter than the length of the discharge mode, the snubber capacitor 144 may have a first polarity (e.g., higher voltage on second lead 206 than first lead 204). If the on-time was coextensive with the length of the discharge mode, the snubber capacitor 144 may have an opposite polarity (e.g., lower voltage on the second lead 206 than first lead 204). In either event, it is unlikely the snubber capacitor 144 will have sufficient stored charge to make the secondary FET 142 conductive in the next discharge mode.

In order to charge the snubber capacitor 144, during each discharge mode the secondary-side controller 150 couples the high-side output voltage $V_{OUTH}$ to the first lead 204 of the snubber capacitor 144. In some example cases, the secondary-side controller 150 couples the current sense input 402 to the first lead 204 by coupling the current sense input 402 to the gate 208 of the secondary FET 142. Because of the negative polarity on the high-side secondary winding 138, current flows through the current sense input 402, to the gate 208 and thus to the first lead 204 of the snubber capacitor 144, as shown by arrow 500 (hereafter current 500). If one considers that the magnitude of the voltage with the negative polarity is approximately equal to the magnitude of the high-side output voltage $V_{OUTH}$, the voltage across the snubber capacitor 144 at the end of the charge mode is approximately twice the magnitude of the high-side output voltage $V_{OUTH}$. Thus, during the charge mode the snubber capacitor 144 is charged with current to be used in a contiguous discharge mode to make the secondary FET 142 conductive. The example cycle then starts anew (as in FIG. 2) at the beginning of the next discharge mode. The specification now turns to example embodiments of the secondary-side controller 150.

Figure 6:
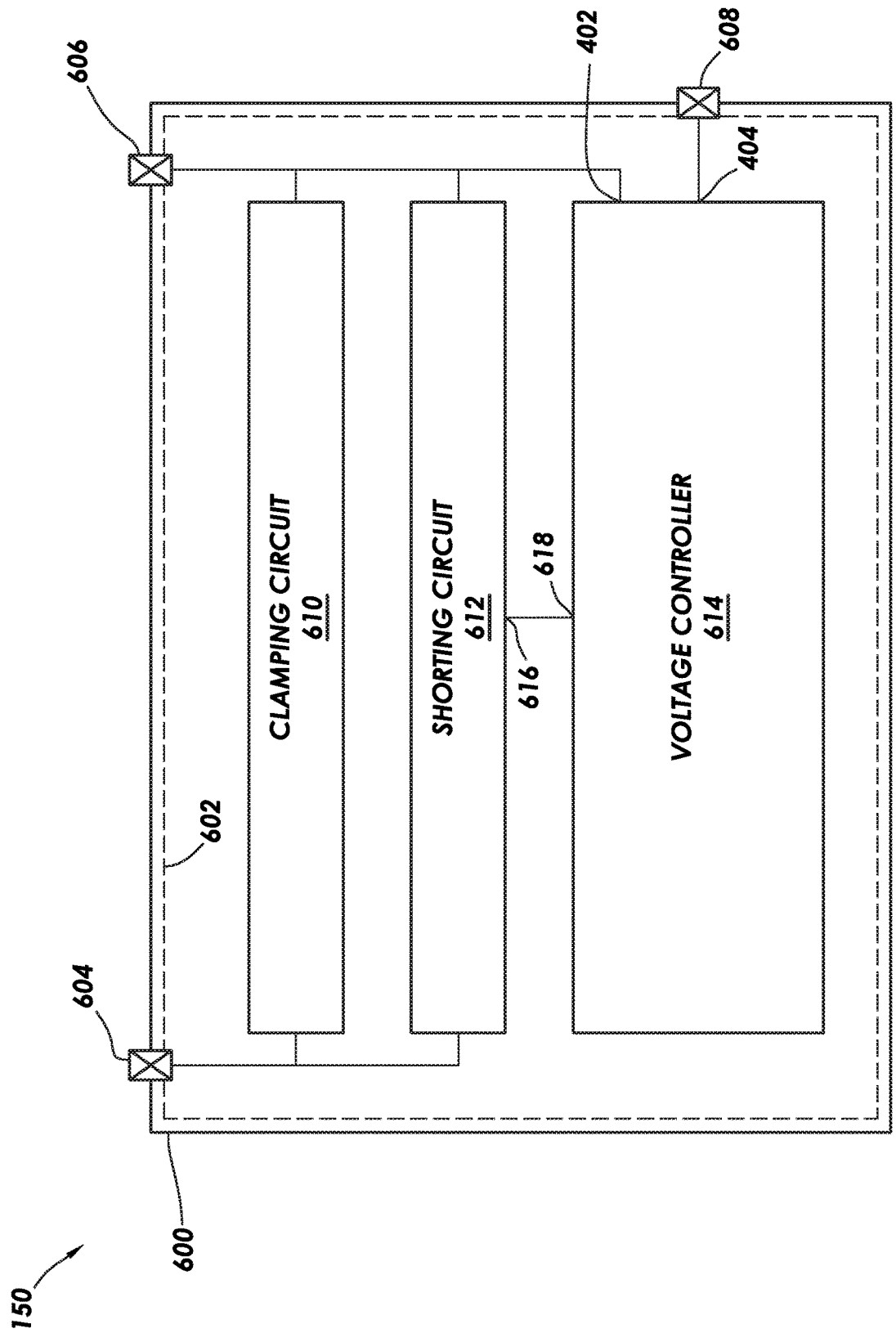
FIG. 6 shows a block diagram of a secondary-side controller, in accordance with at least some embodiments.

FIG. 6 shows a block diagram of a secondary-side controller, in accordance with at least some embodiments. In particular, FIG. 6 shows the secondary-side controller 150 in the form of a packaged integrated circuit (IC) 600. The packaging encapsulates one or more semiconductor dies or chips upon which the various circuits are monolithically constructed. In the example case of FIG. 6, the packaging encapsulates a single semiconductor chip 602, but in other cases the packaging may encapsulate multiple chips (e.g. a multi-chip module). The packaging may take any suitable form, such as a Small Outline IC (SOIC) ten pin package (SOIC-10). The example packaged IC 600 defines a gate terminal 604, a source terminal 606, and a feedback terminal 608. When installed within a power converter, the gate terminal 604 couples to the gate 208 (FIG. 2), the source terminal 606 couples to the source 210 (FIG. 2), and the feedback terminal 608 couples to the high-side voltage output $V_{OUTH}$. Additional terminals will be present (e.g., a common or ground terminal, $V_{CC}$ terminal), but those additional terminals are not shown so as not to unduly complicate the figure.

The example packaged IC 600 in the form of a secondary-side controller 150 includes a clamping circuit 610, a shorting circuit 612, and a controller 614. The clamping circuit is coupled between the gate terminal 604 and the source terminal 606. The clamping circuit 610 is configured to clamp the voltage at the gate terminal 604 relative to the source terminal 606 at a predetermined voltage when current flows into the gate terminal 604. For example, during each discharge mode current from the snubber capacitor 144 (FIG. 1) may flow through the clamping circuit 610 to clamp the voltage at the gate terminal 604 relative to the source terminal 606 to ensure the secondary FET 142 is fully conductive and to ensure the voltage on the gate 208 does not exceed design tolerances.

The example packaged IC 600 in the form of a secondary-side controller 150 also includes the shorting circuit 612. The example shorting circuit 612 defines a control input 616, and the example shorting circuit 612 is coupled between the gate terminal 604 and the source terminal 606. The shorting circuit 612 is configured to couple the gate terminal 604 to the source terminal 606 responsive to assertion of the control input 616. Thus, under command of the controller 614 the shorting circuit 612 may make the secondary FET 142 (FIG. 1) non-conductive as part of controlling on-time for voltage control of the high-side voltage output $V_{OUTH}$.

The example packaged IC 600 in the form of a secondary-side controller 150 also includes the voltage controller 614. The example voltage controller 614 defines feedback input 404 coupled to the feedback terminal 608. The example voltage controller 614 also defines the current sense input 402 coupled to the source terminal 606. Finally, the voltage controller 614 defines a control output 618 coupled to the control input 616. The example voltage controller 614 is configured to sense each discharge mode of the power converter, and during each discharge mode the voltage controller 614 is configured to control the on-time by controlling or modulating a length of time the clamping circuit 610 clamps at the predetermined voltage. The control of the on-time is based on a voltage sensed at the feedback terminal 608. In particular, during the on-time within each discharge mode, the shorting circuit 612 acts as an open circuit, and thus excess current from the snubber capacitor 144 (FIG. 1) is enabled to flow into the gate terminal 604, through the clamping circuit 610, and out the source terminal 606. However, when the voltage controller 614 determines that the on-time should end, the voltage controller 614 asserts the control output 618, which asserts the control input 616 to the shorting circuit 612. The shorting circuit 612, in turn, couples or shorts the gate terminal 604 to the source terminal 606, which drains the current from the gate terminal and thus makes the secondary FET 142 non-conductive. During the next charge mode, the example clamping circuit 610 provides current (e.g., current 500 of FIG. 5) from the source terminal 606 to the gate terminal 604 to charge the snubber capacitor 144.

Figure 7:
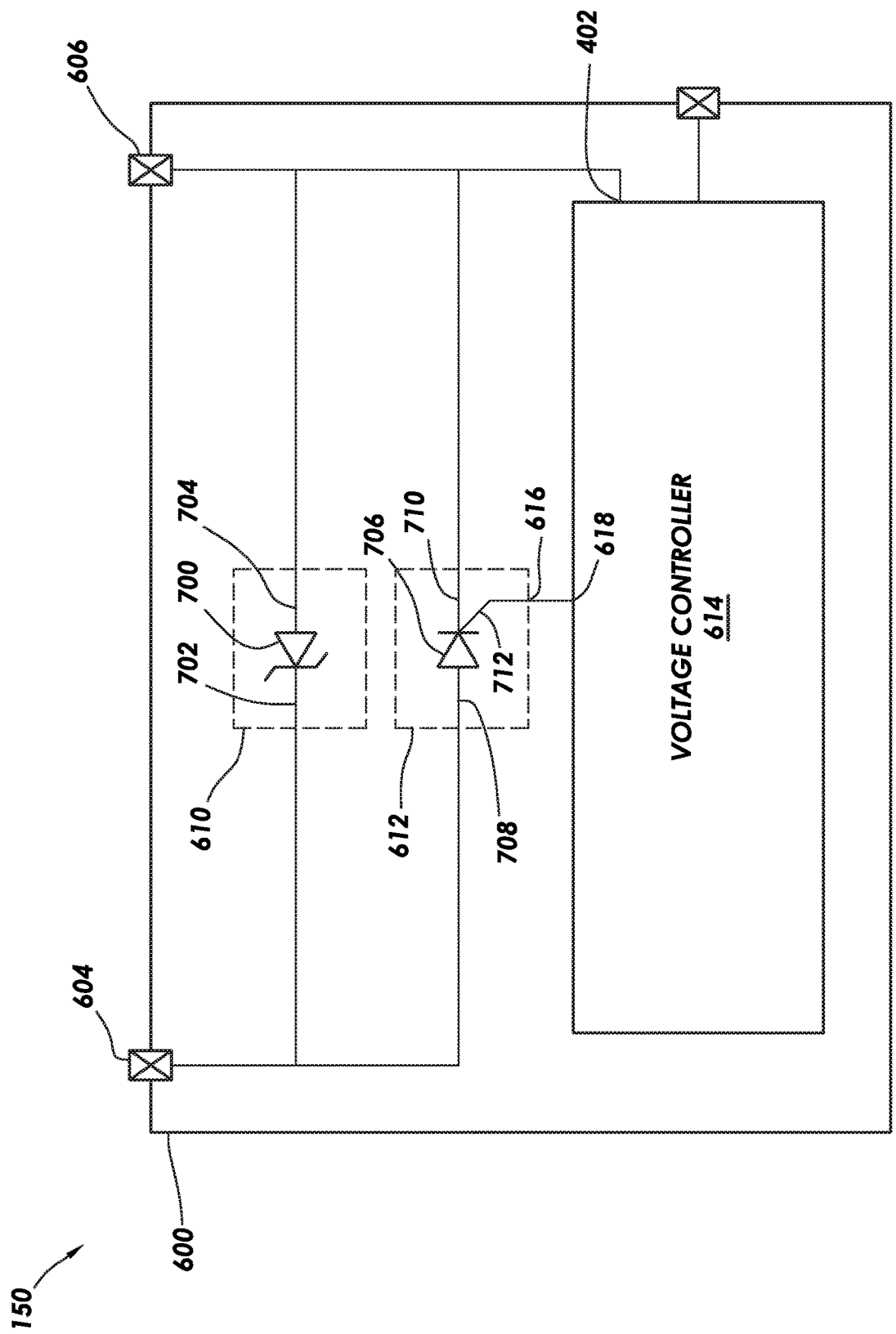
FIG. 7 shows a block diagram of a secondary-side controller, in accordance with at least some embodiments.

FIG. 7 shows a block diagram of a secondary-side controller, in accordance with at least some embodiments. In particular, FIG. 7 shows the secondary-side controller 150 in the form of the packaged IC 600. The clamping circuit 610 is illustratively shown as a Zener diode 700 defining a cathode 702 coupled to the gate terminal 604, and an anode 704 coupled to the source terminal 606. The example Zener diode 700 performs multiple functions. During the early stages of the each discharge mode the Zener diode 700 carries current 306 (FIG. 3) and thus clamps the voltage from the gate terminal 604 relative to the source terminal 606 at the reverse breakdown voltage of the Zener diode 700. During the charge mode, the Zener diode 700 carries current from the source terminal 606 to the gate terminal 604 to charge the snubber capacitor 144 (FIG. 1). Other circuits may be used to perform the functions of the clamping circuit, such as a transistor driven into its active region (e.g., driven by the controller 614).

FIG. 7 also an example shorting circuit 612 in the form a thyristor 706. The thyristor 706 (sometimes referred to as a silicon-controlled rectifier (SCR)) includes an anode 708, a cathode 710, and a gate 712 (that defines the control input 616). Operationally, thyristor 706 remains non-conductive in the presence of a forward bias until the gate 712 is asserted. Once the gate 712 is asserted, the thyristor 706 conducts current from the anode 708 to the cathode 710 (regardless of the state of the gate 712). Once the thyristor 706 is reversed biased, the ability to conduct is again cut off until the gate 712 is again asserted in the presence of a forward bias across the thyristor 706. Thus, the thyristor 706 is used in example cases to short the gate terminal 604 to the source terminal 606 to drain current from the gate of secondary FET 142 to make the secondary FET 142 non-conductive. Other circuits may be used, such as a transistor operated as an electrically controlled switch.

The example secondary-side controller 150 can be operated at any switching frequency on the primary side of the power converter. The secondary-side controller 150 senses a discharge mode, and controls the on-time based on or as a function of the high-side voltage output $V_{OUTH}$. Thus, in at least some embodiments the secondary-side controller 150 (particularly the voltage controller 614) does not have or implement an oscillator. The lack of an oscillator thus makes the voltage controller 614 and the secondary-side controller 150 smaller and less expensive to build.

Figure 8:
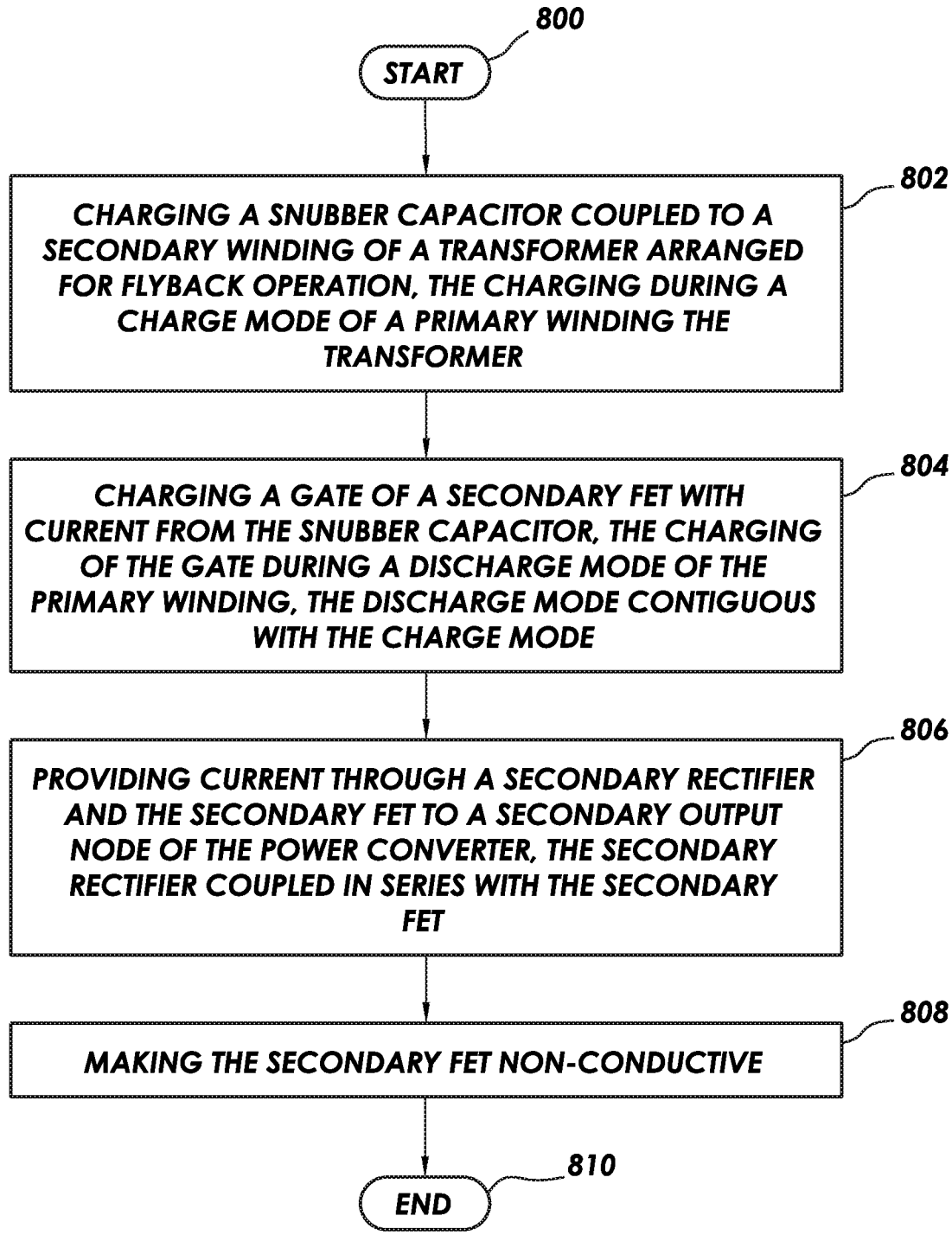
FIG. 8 shows a method in accordance with at least some embodiments.

FIG. 8 shows a method in accordance with at least some embodiments. In particular, the method starts (block 800) and comprises: charging a snubber capacitor coupled to a secondary winding of a transformer arranged for flyback operation, the charging during a charge mode of a primary winding the transformer (block 802); charging a gate of a secondary FET with current from the snubber capacitor (e.g., to make the secondary FET conductive), the charging of the gate during a discharge mode of the primary winding, the discharge mode contiguous with the charge mode (block 804); providing current through a secondary rectifier and the secondary FET to a secondary output node of the power converter, the secondary rectifier coupled in series with the secondary FET (block 806); and making the secondary FET non-conductive (block 808). Thereafter, the method ends (block 810).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, comprising:
charging a snubber capacitor coupled to a secondary winding of a transformer arranged for flyback operation, the charging during a charge mode of a primary winding of the transformer;
charging a gate of a secondary field effect transistor (FET) with current from the snubber capacitor, the charging of the gate during a discharge mode, and the charging makes the secondary FET fully conductive before a secondary rectifier coupled in series with the secondary FET is forward biased, the discharge mode is contiguous with the charge mode;
providing current through the secondary rectifier and the secondary FET to a secondary output node of the power converter, the secondary rectifier coupled in series with the secondary FET; and
making the secondary FET non-conductive.

2. The method of claim 1 wherein charging the gate further comprises charging the gate before a voltage across the secondary winding reaches zero volts in a voltage swing from negative polarity during the charge mode to positive polarity during the discharge mode.

3. The method of claim 1 wherein making the secondary FET non-conductive further comprises making the secondary FET non-conductive while the secondary rectifier is forward biased, and the secondary FET becoming non-conductive ends an on-time of the secondary FET.

4. The method of claim 3 wherein making the secondary FET non-conductive further comprises making the secondary FET non-conductive to control the on-time based on a magnitude of a voltage of the secondary output node.

5. The method of claim 1 wherein making the secondary FET non-conductive further comprises making the secondary FET non-conductive during the discharge mode.

6. The method of claim 1 wherein making the secondary FET conductive further comprises clamping a voltage across a gate and a source of the secondary FET by way of a Zener diode.

7. The method of claim 6 wherein charging the snubber capacitor further comprises charging the snubber capacitor through the Zener diode.

8. The method of claim 1 making the secondary FET non-conductive further comprises shorting a gate to a source of the secondary FET through a thyristor.

9. A switching power converter comprising:
a primary side including:
a primary winding of a transformer;
a main switch coupled between the primary winding and a reference voltage on the primary side, the main switch defining a control input;
a primary-side controller coupled to the control input of the main switch and a voltage feedback circuit, the primary-side controller configured to control the main switch based on a voltage indicative of a low-side voltage output;
a secondary side including:
a low-side secondary winding of the transformer coupled to the low-side voltage output;
a low-side rectifier coupled between the low-side secondary winding and the low-side voltage output, the low-side secondary winding and the low-side rectifier arranged for flyback operation of the low-side secondary winding;
a high-side secondary winding of the transformer coupled to a high-side voltage output;

a high-side rectifier defining an anode and a cathode, the anode coupled to the high-side secondary winding;

a secondary field effect transistor (FET) defining a gate, a source, and a drain, the drain coupled to the cathode of the high-side rectifier, and the source coupled to the high-side voltage output;

a snubber capacitor having a first lead coupled directly to the anode of the high-side rectifier, and a second lead of the snubber capacitor coupled directly to the gate of the secondary FET;

a secondary-side controller coupled to the gate of the secondary FET, the source of the secondary FET, and the high-side voltage output, the secondary-side controller configured to sense each discharge mode of the switching power converter, and during each discharge mode control a length of time the secondary FET is conductive based on a voltage of the high-side voltage output.

10. The switching power converter of claim 9 wherein the secondary-side controller further comprises:

a clamping circuit coupled between the gate and the source of the secondary FET, the clamping circuit configured to clamp voltage at the gate relative to the source a predetermined voltage when current flows toward the high-side voltage output;

a shorting circuit defining a control input, and the shorting circuit coupled between the gate and the source, the shorting circuit configured to make the secondary FET non-conductive by coupling the gate to the source responsive to assertion of the control input; and a controller configured to sense each discharge mode of the switching power converter, and during each discharge mode the controller configured to control the length of time by controlling how long the clamping circuit clamps at the predetermined voltage.

11. The switching power converter of claim 10 wherein the shorting circuit is further configured to provide current from the source to the gate during each charge mode of the switching power converter.

12. The switching power converter of claim 11 wherein the clamping circuit further comprises a Zener diode having a cathode coupled to the gate and an anode coupled to the source.

13. The switching power converter of claim 10 wherein the shorting circuit further comprises a thyristor having an anode coupled to the source and a cathode coupled to the gate.

14. The switching power converter of claim 9 wherein the clamping circuit further comprises a Zener diode having a cathode coupled to the gate and an anode coupled to the source.

15. The switching power converter of claim 9 wherein the snubber capacitor is configured to charge the gate of the secondary FET and make the secondary FET fully conductive before a voltage across the high-side secondary winding reaches zero volts in a voltage swing from a negative polarity during a charge mode of the transformer to a positive polarity during a discharge mode of the transformer.

16. The switching power converter of claim 9 wherein the snubber capacitor is configured to charge the gate of the secondary FET and make the secondary FET fully conductive before the high-side rectifier is forward biased in a voltage swing of the high-side secondary winding from a negative polarity during a charge mode of the transformer to a positive polarity during a discharge mode of the transformer.

* * * * *